June 11, 1929.    J. HABRIE    1,716,548
TRANSMISSION MECHANISM
Filed Aug. 23, 1927    2 Sheets-Sheet 1
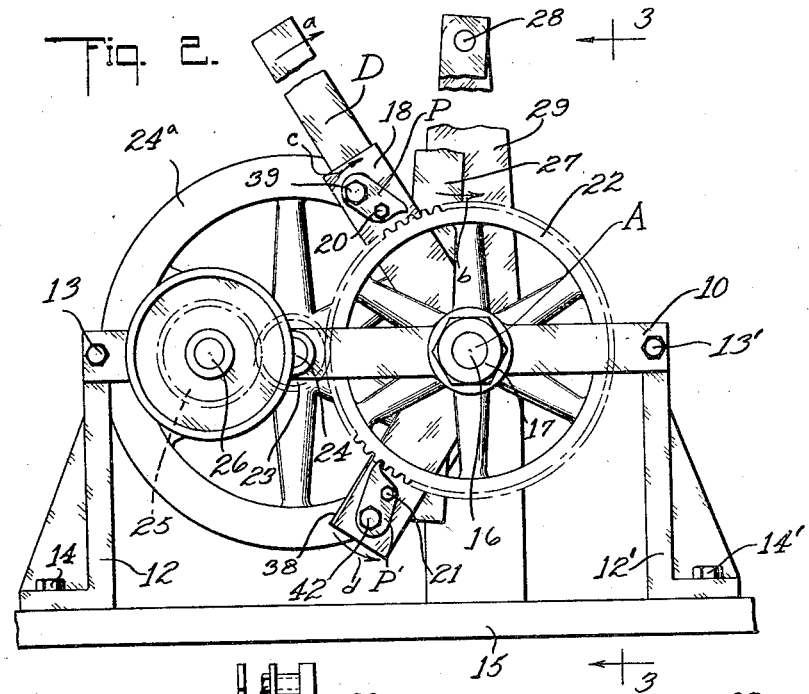
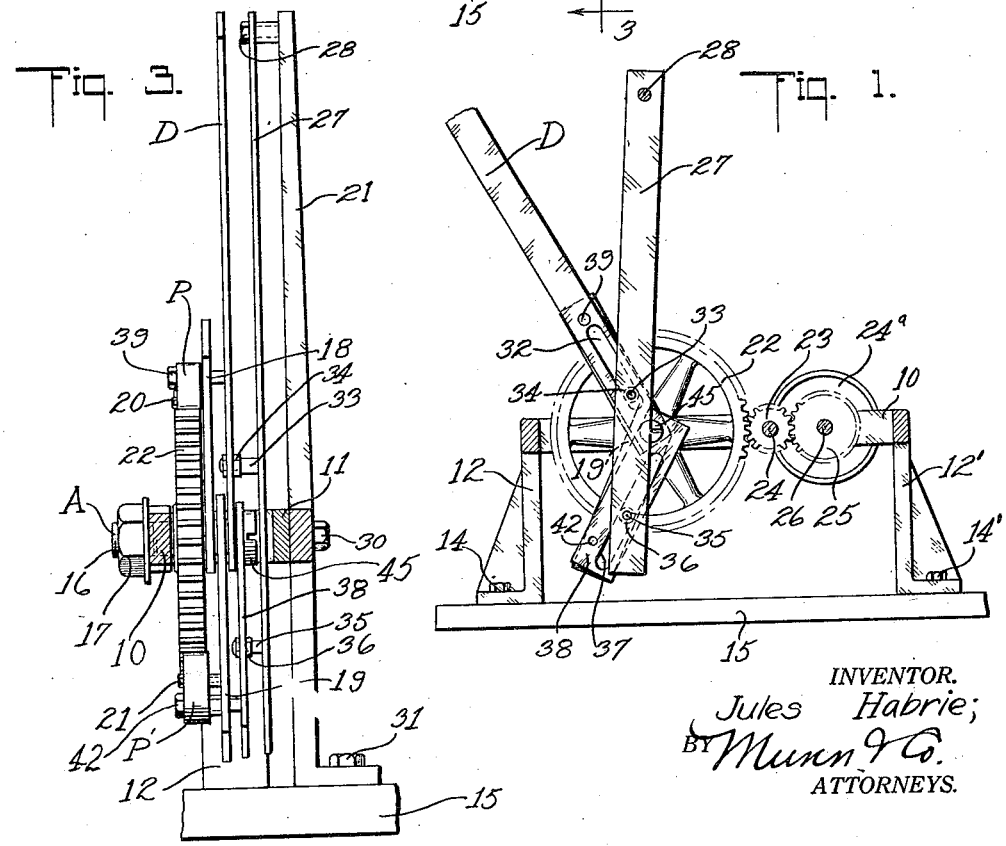
INVENTOR.
Jules Habrie;
BY Munn & Co.
ATTORNEYS.

June 11, 1929.  J. HABRIE  1,716,548

TRANSMISSION MECHANISM

Filed Aug. 23, 1927  2 Sheets-Sheet 2

INVENTOR
Jules Habrie;
BY Munn & Co.
ATTORNEY

Patented June 11, 1929.

1,716,548

UNITED STATES PATENT OFFICE.

JULES HABRIE, OF SAWTELLE, CALIFORNIA, ASSIGNOR TO FREDERICK N. OERTLING, OF SAWTELLE, CALIFORNIA.

TRANSMISSION MECHANISM.

Application filed August 23, 1927. Serial No. 214,971.

My invention relates to transmission mechanisms or mechanical movements of the general character embodied in my United States Patent No. 1,411,345, issued April 4, 1922, which involves rachet and pawl means for effecting uni-directional rotation of a driven element in response to oscillatory motion of an operating member.

It is a purpose of my present invention to provide a transmission mechanism of the above described character by which the wear and tear on the pawls and on the rachet, as well as the undesirable noise caused by the pawls clicking over the teeth of the rachet during the idle strokes of the pawls, will be eliminated, and the pawls positively controlled in such manner that they will have actual engagement with the teeth of the rachet only during their driving strokes and will be positively moved and maintained out of engagement with the teeth of the rachet during their idle strokes, thus greatly prolonging the life of the pawls and rachet and rendering their operation practically silent.

It is a further purpose of my invention to provide a transmission mechanism of this character embodying means whereby a maximum oscillatory movement of the operating member can be effected, and yet the pawls maintained in engagement with the teeth of the rachet during their driving strokes, to the end that maximum rotational movement of the driven element can be effected with a minimum number of oscillations of the operating member.

I will describe only one form of transmission mechanism embodying my invention and will then point out the novel features in claims.

In the accompanying drawings.

Figure 1 is a view showing, in side elevation partly broken away, one form of transmission mechanism embodying my invention.

Figure 2 is an enlarged view showing in side elevation the opposite side of the mechanism illustrated in Figure 1.

Figure 3 is a sectional view taken on the lines 3—3 of Figure 2 and looking in the direction of the arrows.

Figure 4:
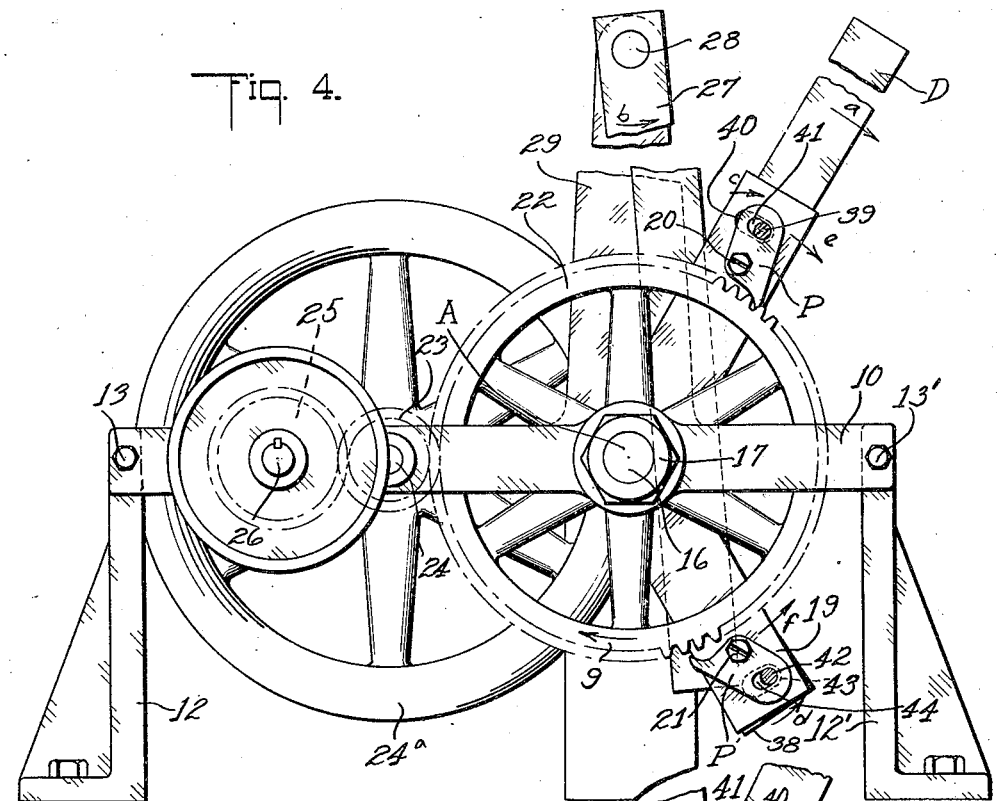
Figures 4 and 5 are enlarged views similar to Figure 2 and illustrating different positions occupied by the mechanism.

Referring specifically to the drawings in which similar reference characters designate similar parts in each of the several views, my invention in its present embodiment comprises a frame F including side members 10 and 11 supported in side by side spaced relation and in a horizontal elevated position by a pair of L shaped brackets 12 and 12', the brackets being secured by bolts 13 and 13' respectively to the members and by bolts 14 and 14' respectively to a base plate 15. Extending through an opening formed in the member 10 is the reduced threaded end 16 of a stub axle A, while a nut 17 is threaded on the end 16 to rigidly secure the axle to the member as clearly shown in Figure 3. Mounted to oscillate freely on the axle A is an operating member D in the form of a lever, while also mounted on the axle to one side of the member D and in side by side relation is a pair of arms 18 and 19 having headed studs 20 and 21 respectively upon which are pivotally mounted pawls P and P', respectively, adapted to have driving engagement with the teeth of a driven member in the form of a gear 22 rotatably mounted on the axle and constituting a rachet wheel for the pawls. The gear 22 constantly meshes with a pinion 23 fixed to a shaft 24 journaled in the side members 10 and 11 and carrying a flywheel 24$^a$, while the pinion 23 constantly meshes with a pinion 25 fixed to a shaft 26 also journaled in the side members 10 and 11 and constituting a power take-off shaft.

An arm 27 is mounted for oscillating movement on a headed stud 28 secured to the upper end of an L shaped bracket 29 supported from the side member 11 by bolts 30 and from the base plate 15 by bolts 31. The operating member D is provided with a slot 32 into which projects a headed pin 33 carrying an anti-friction roller 34, the pin being fixed to the arm 27 so that oscillatory movement of the operating member D will oscillate the arm. Fixed to the arm 27 adjacent its lower end is a headed pin 35 carrying an antifriction roller 36 adapted to travel in a slot 37 formed in an arm 38 freely mounted on the axle A so that oscillatory movement of the arm 27 by the operating member D will in turn oscillate the arm 38.

Secured to the operating member D is a headed stud 39 which projects through a transverse slot 40 formed in the pawl carrying arm 18 and then through a relatively short slot 41 formed in the pawl P, while a second headed stud 42 is secured to the arm 38 adjacent its lower end and projects through a transverse slot 43 formed in the pawl carrying arm 19 and then through a relatively short slot 44 formed in the pawl P'. As clearly shown in Figure 3, the axle A is provided with a head 45 which co-operates with the side member 10 in preventing lateral displacement of the parts mounted on the axle.

The operation of the mechanism is as follows.

Referring particularly to Figure 2, let it be assumed that the operating member D is moved in the direction of the arrow $a$ about the axle A, to thus cause the arm 27 to be moved about the stud 28 in the direction of the arrow $b$, through the medium of the pin 33 and slot 32, while this movement of the arm 27 effects movement of the arm 38 about the axle A, through the medium of the pin 35 and slot 37. The initial movement of the operating member D causes the pawl P to be rocked by the stud 39 about the stud 20, in the direction of the arrow $c$ to thus move the pawl into engagement with the teeth of the gear 22, while the initial movement of the arm 38 causes the pawl P' to be rocked by the stud 42 about the stud 21, in the direction of the arrow $d$ to thus positively move the pawl P' out of engagement with the teeth of the gear. It will be noted that during this initial movement of the operating member D and arm 38, the studs 39 and 42 merely traverse the slots 40 and 43 respectively, the lengths of these slots being sufficient to cause rocking of the pawls P and P' into and out of engagement respectively, with the gear 22 without effecting movement of the pawl carrying arms 18 and 19. However, upon reaching the ends of their respective slots the studs 39 and 42 provide a positive driving connection to cause the arms 18 and 19 to be rocked in reverse directions about the axle A, in the direction of the arrows $e$ and $f$ as clearly shown in Figure 4. As the pawl P is positively maintained in engagement with the teeth of the gear 22 so long as the operating member is moved in the direction of the arrow $a$, the gear will be positively rotated in the direction of the arrow $g$, while the pawl P' will be positively maintained out of engagement with the teeth of the gear, thus preventing any clicking noise of the pawl P' upon the teeth of the gear during this idle stroke of the pawl.

Figure 5:
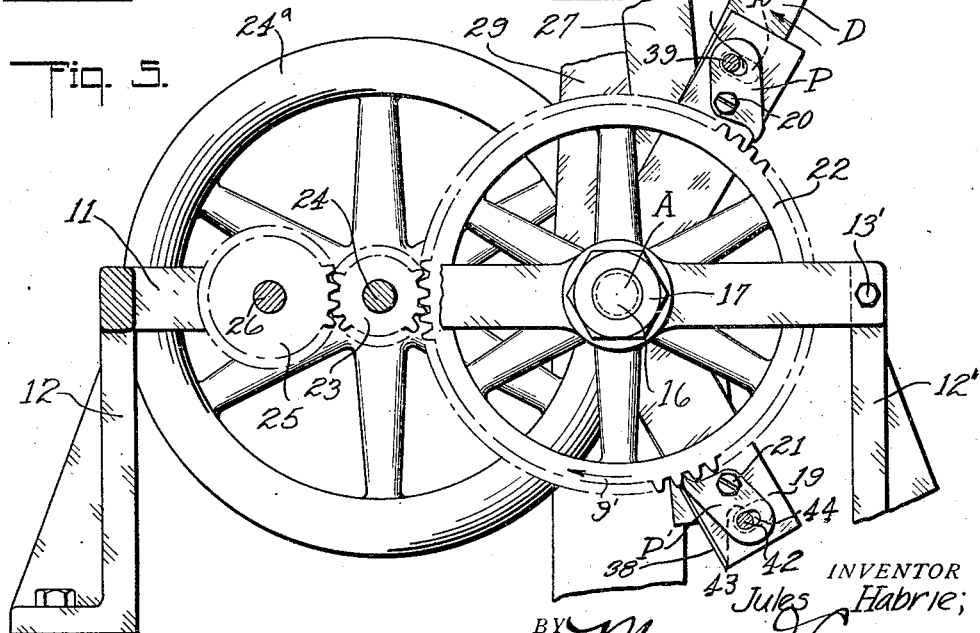

Upon reversing the movement of the operating member D the positions of the pawls will first be reversed so that the pawl P is moved and positively maintained out of engagement with the teeth of the gear 22 while the pawl P' will be moved into engagement with the teeth of the gear, all as shown in Figure 5, to positively rotate the gear in the direction of the arrow $g$. It will thus be clear that the direction of movement of the operating member D positively controls the positions of the pawls with respect to the teeth of the gear 22, so that one of the pawls will be positively maintained in driving engagement with the gear while the other pawl will be positively maintained out of engagement with the gear, and that regardless of the direction of movement of the operating member D the gear 22 will be rotated in one and the same direction.

By the mounting of both the pawl carrying arms 18 and 19 directly upon the axis of the gear 22, the movement of the studs 20 and 21 with the arms will be concentric with the axle A so that the extent of movement of the arms will not affect the relation of the pawls to the teeth of the gear as determined by the direction of movement of the operating member D, thus permitting the latter to be oscillated through an arc of practically 180°, to the end that maximum rotational movement of the gear or driven element 22 can be effected with a minimum number of oscillations of the operating member.

It will be manifest that the operating member D can be manually or otherwise actuated from any suitable source of power, and that the resulting uni-directional rotation of the power take-off shaft 26 can be employed in many ways to perform useful work.

Although I have herein shown and described only one form of transmission mechanisms embodying my invention, it is to be understood that various changes and modifications may be made therein without departing from the spirit of the invention and the spirit and scope of the appended claims.

I claim:

1. A transmission mechanism comprising an axle, a toothed wheel rotatable on the axle, an operating member mounted for oscillating movement on the axle, a pair of arms pivotally mounted on the axle, pawls carried by the arms and adapted to have driving engagement with said wheel, and means responsive to oscillatory movement of the member in one direction to move one pawl into driving engagement with said wheel and the other pawl out of engagement with the wheel, and responsive to oscillatory movement of the member in the other direction to reverse the position of the pawls, whereby the pawls will be alternately engaged with and disengaged from said wheel to effect uni-directional rotation of the latter.

2. A transmission mechanism as embodied in claim 1 wherein said means comprises an arm mounted for oscillating movement eccentrically of the axle and having a pin and slot connection with said operating member so as to be oscillated by the latter, a second arm freely mounted on the axle and having a pin and slot connection with the first arm, so as to be oscillated by the latter, and studs carried by the operating member and second arm, one of the studs having a lost motion connection with one of said pawl carrying arms and an operative connection with the pawl carried thereby while the other of the studs has a lost motion connection with the other of the pawl carrying arms and an operative connection with the pawl carried thereby.

3. A transmission mechanism comprising an axle, a toothed wheel rotatable on the axle, an operating lever mounted for oscillating movement on the axle, a pair of arms mounted for oscillating movement on the axle, and having transversal slots therein, a pawl pivotally mounted on each of the arms and adapted to have driving engagement with said wheel, each of said pawls having a slot therein, a third arm mounted for oscillating movement eccentrically of the operating lever and having a pin and slot connection with the latter so as to be oscillated thereby, a fourth arm mounted for oscillating movement on the axle and having a pin and slot connection with said third arm so as to be oscillated by the latter, and a pair of studs, one of which is carried by the operating lever and projects into the transverse slot of one of the pair of arms and into the slot of its respective pawl, while the other stud is carried by said third arm and projects into the transverse slot of the other of said pair of arms and into the slot of its respective pawl.

4. A transmission mechanism comprising a toothed wheel mounted for rotary movement, an operating member mounted for oscillating movement, a pair of arms mounted for oscillating movement, a pawl mounted for rocking movement on each of the arms and adapted to have driving engagement with the ratchet, means operatively connected to one of said arms and to the pawl carried thereby for rocking the pawl into driving engagement with said wheel and moving the arm in response to oscillating movement of the operating member in one direction, to thereby rotate said wheel in one direction, and means operatively connected to the other of said arms and to the pawl carried thereby for rocking the latter out of engagement with said wheel and moving the last mentioned arm, in response to oscillating movement of the operating member in said direction, said first and last means operable in response to oscillating movement of the operating member in the other direction to reverse said positions of the pawls and the direction of movement of said arms, to thereby rotate said wheel in said direction, whereby the toothed wheel will be rotated in one and the same direction regardless of the direction of movement of said operating member, said first means comprising an arm mounted for oscillating movement and having a pin and slot connection with the operating member, so as to be oscillated by the latter, and a stud carried by the operating member and having a lost motion connection with one of the pairs of arms and an operative connection with the pawl carried by the latter, and said last means comprising a second arm mounted for oscillating movement and having a pin and slot connection with said first oscillating arm so as to be oscillated thereby, and a second stud carried by said second arm and having a lost motion connection with the other of said pair of arms and an operative connection with the pawl carried by the latter.

5. A transmission mechanism comprising a driven element mounted for rotary movement about a fixed axis, an operating member mounted for oscillating movement about the axis of the driven element, a pair of arms mounted for pivotal movement about the axis of the driven element, pawls carried by the arms and adapted to have driving engagement with the driven element, and means responsive to oscillatory movement of the operating member in one direction to move one pawl into driving engagement with the driven element and the other pawl free of the driven element, and responsive to oscillatory movement of the operating member in the other direction, to reverse the positions of the pawls, whereby the pawls will be alternately engaged with and moved free of the driven element to effect unidirectional rotation of the latter, said means comprising an arm mounted for oscillating movement eccentrically of the axis of the driven element and having an operative connection with the operating member so as to be oscillated by the latter, a second arm mounted for movement about the axis of the driven element and having an operative connection with the first arm, and studs carried by the operating member and second arm, one of the studs having a lost motion connection with one of said pawl carrying arms and an operative connection with the pawl carried thereby, while the other of the studs has a lost motion connection with the other of the pawl carrying arms and an operative connection with the pawl carried thereby.

JULES HABRIE.